United States Patent
Luce

(10) Patent No.: US 9,303,710 B2
(45) Date of Patent: Apr. 5, 2016

(54) AIRCRAFT SHOCK STRUT AND REBOUND DAMPING RING

(71) Applicant: Goodrich Corporation, Charlotte, NC (US)

(72) Inventor: William Luce, Colleyville, TX (US)

(73) Assignee: GOODRICH CORPORATION, Charlotte, NC (US)

(*) Notice: Subject to any disclaimer, the term of this patent is extended or adjusted under 35 U.S.C. 154(b) by 304 days.

(21) Appl. No.: 13/963,817

(22) Filed: Aug. 9, 2013

(65) Prior Publication Data

US 2015/0041268 A1 Feb. 12, 2015

(51) Int. Cl.
| | |
|---|---|
| F16F 9/00 | (2006.01) |
| F16F 9/18 | (2006.01) |
| F16J 9/26 | (2006.01) |
| F16F 9/32 | (2006.01) |
| B64C 25/02 | (2006.01) |
| B64C 25/60 | (2006.01) |

(52) U.S. Cl.
CPC . *F16F 9/18* (2013.01); *B64C 25/02* (2013.01); *B64C 25/60* (2013.01); *F16F 9/3214* (2013.01); *F16F 9/3235* (2013.01); *F16J 9/26* (2013.01)

(58) Field of Classification Search
CPC ............. F16F 9/18; F16F 9/26; F16F 9/3235; F16F 9/3214; B64C 25/02; B64C 25/60
USPC .......................... 188/316, 317, 289, 297, 318; 244/100 R, 102 SS, 104 FP
See application file for complete search history.

(56) References Cited

U.S. PATENT DOCUMENTS

| | | | |
|---|---|---|---|
| 3,652,040 A | | 3/1972 | Hartel |
| 3,676,200 A | | 7/1972 | Rembold, et al. |
| 3,747,913 A | | 7/1973 | Savery |
| 4,126,212 A | * | 11/1978 | Crawley ......................... 188/317 |
| 4,595,159 A | * | 6/1986 | Hrusch .................... 244/104 FP |
| 4,729,529 A | * | 3/1988 | Hrusch .................... 244/104 FP |
| 4,787,486 A | * | 11/1988 | Hrusch et al. ................. 188/289 |
| 4,907,760 A | * | 3/1990 | Sealey et al. .............. 244/100 R |
| 5,230,364 A | | 7/1993 | Leng |

(Continued)

FOREIGN PATENT DOCUMENTS

| | | |
|---|---|---|
| DE | 19942167 | 3/2001 |
| EP | 2210811 | 7/2010 |

OTHER PUBLICATIONS

Extended European Search Report dated Feb. 2, 2015 in European Application No. 14174740.2.

*Primary Examiner* — Thomas J Williams
*Assistant Examiner* — Mariano Sy
(74) *Attorney, Agent, or Firm* — Snell & Wilmer, LLP

(57) ABSTRACT

A shock strut for an aircraft landing gear is disclosed. The shock strut may include a piston with a piston inner surface and a piston outer surface. A telescoping component may be coaxially aligned and slidably engagable with the piston. At least one of the piston and the telescoping component may be a titanium material. A groove defined by an upper lip and a lower lip may be coupled to at least one of the piston or the telescoping component. A piston ring may be in direct contact with the titanium material. The piston ring may be non-metallic and provide sliding engagement with the titanium material to seal a radial space between the piston and the telescoping component. The piston ring may be at least partially held within the groove, and the groove may limit axial movement of the piston ring.

17 Claims, 8 Drawing Sheets

(56) References Cited

U.S. PATENT DOCUMENTS

| | | | |
|---|---|---|---|
| 5,310,139 A * | 5/1994 | Derrien et al. | 244/104 FP |
| 5,333,826 A | 8/1994 | Lai | |
| 6,676,076 B1 * | 1/2004 | Davies | 244/102 R |
| 8,070,095 B2 * | 12/2011 | Luce et al. | 244/102 SS |
| 8,556,209 B2 * | 10/2013 | Luce | 244/102 SS |
| 2004/0228555 A1 | 11/2004 | Kim et al. | |
| 2007/0194172 A1 * | 8/2007 | Luce et al. | 244/100 R |
| 2009/0218444 A1 * | 9/2009 | Lahargou et al. | 244/102 SL |
| 2010/0117310 A1 * | 5/2010 | Celik et al. | 277/650 |
| 2010/0181423 A1 * | 7/2010 | Martin et al. | 244/104 FP |

* cited by examiner

AIRCRAFT SHOCK STRUT AND REBOUND DAMPING RING

FIELD

The present disclosure relates to landing gear, and more particularly, to shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. The shock struts used in the landing gear of aircraft generally are subject to more demanding performance requirements than most, if not all, ground vehicle shock absorbers. In particular, shock struts control motion of the landing gear, and absorb and damp loads imposed on the gear during landing, taxiing and takeoff.

A shock strut generally accomplishes these functions by compressing a fluid within a sealed chamber formed by hollow, telescoping cylinders. Typically, at least two bearing assemblies provide for sliding engagement of the telescoping cylinders. The fluid generally includes both a gas and a liquid, such as hydraulic fluid or oil. One type of shock strut generally utilizes an "air-over-oil" arrangement, wherein a trapped volume of gas is compressed as the shock strut is axially compressed, and a volume of oil is metered through an orifice. The gas acts as an energy storage device (e.g., like a spring), so that upon termination of a compressing force, the shock strut returns to its original length. Shock struts also dissipate energy by passing the oil through the orifice so that as the shock absorber is compressed or extended, its rate of motion is limited by the damping action from the interaction of the orifice and the oil.

SUMMARY

A shock strut is disclosed. In various embodiments, a shock strut may comprise a piston having a piston inner surface and a piston outer surface. The shock strut may comprise at least one telescoping component coaxially aligned and slidably engagable with the piston. At least one of the piston and the at least one telescoping component comprises a titanium material. The shock strut may comprise a groove defined by an upper lip and a lower lip coupled to at least one of the piston or the at least one telescoping component. At least one piston ring may be in direct contact with the titanium material, wherein the at least one piston ring comprises a non-metallic material providing sliding engagement with the titanium material to seal a radial space between the piston and the at least one telescoping component. The at least one piston ring is at least partially held within the groove, and the groove limits axial movement of the at least one piston ring.

An aircraft shock strut is disclosed. The aircraft shock strut may comprise a piston having a piston inner surface and a piston outer surface. At least one telescoping component may be coaxially aligned and slidably engagable with the piston. The aircraft shock strut may comprise a groove defined by an upper lip and a lower lip coupled to at least one of the piston or the at least one telescoping component. At least one piston ring may be in contact with the piston. At least one of the piston and the at least one telescoping component comprises a titanium material, and the at least one piston ring comprises a non-metallic material providing sliding engagement with the titanium material to seal a radial space between the piston and the at least one telescoping component. The at least one piston ring is at least partially held within the groove, and the groove limits axial movement of the at least one piston ring.

An aircraft landing gear is disclosed. The aircraft landing gear may comprise a piston having a piston inner surface and a piston outer surface. The aircraft landing gear may comprise at least one telescoping component coaxially aligned and slidably engagable with the piston. The aircraft landing gear may comprise a groove defined by an upper lip and a lower lip coupled to at least one of the piston or the at least one telescoping component. The aircraft landing gear may comprise at least one piston ring in contact with the piston, wherein at least one of the piston and the at least one telescoping component comprises a titanium material. The at least one piston ring may comprise a non-metallic material providing sliding engagement with the titanium material to seal a radial space between the piston and the at least one telescoping component, wherein the at least one piston ring is at least partially held within the groove, and wherein the groove limits axial movement of the at least one piston ring.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
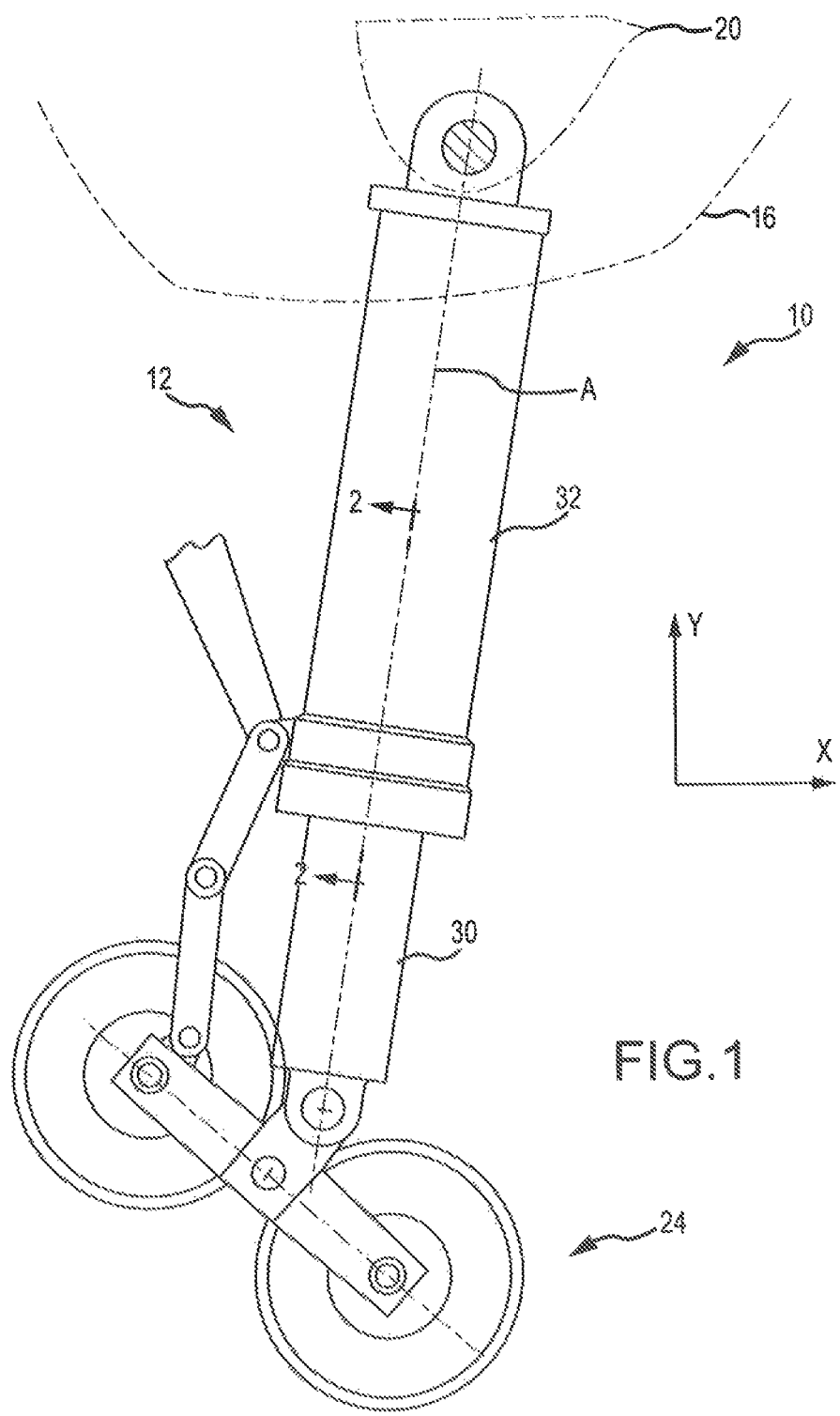
FIG. 1 illustrates a schematic elevation view of a landing gear assembly incorporating a shock strut according to various embodiments.

Referring to FIG. 1, an aircraft landing gear assembly 10 is illustrated according to various embodiments. Aircraft landing gear assembly 10 may be, for example, a main landing gear assembly, a nose landing gear assembly, body or wing landing gear assemblies, a centerline landing gear assembly or the like, including an aircraft shock strut 12, shown mounted at an upper end to an aircraft structure 16 by an attachment member 20. The references herein to a shock strut or an aircraft shock strut refer to shock struts employed in aircraft landing gear. The lower end of the shock strut 12 may be attached to a wheel assembly 24. "Up" or "upper" may refer to the positive y-direction in FIG. 1, and "down" or "lower" may refer to the negative y-direction in FIG. 1. The aircraft structure 16, attachment member 20 and wheel assembly 24 are part of the aircraft structure, but are shown in simple or outline form, while other structures such as locking mechanisms and retracting mechanisms are not shown in FIG. 1 in order to avoid obscuring the shock strut.

In various embodiments, shock strut 12 may include a piston 30 and a cylinder 32, which may be cylindrical or any other shape, if desired. Shock strut 12 may be configured for attachment to aircraft structure 16 and wheel assembly 24 such that piston 30 communicates forces to and from the wheel assembly 24. Cylinder 32 may receive piston 30 in a manner that permits relative telescoping movement between cylinder 32 and piston 30 to absorb and dampen shock forces being transmitted to aircraft structure 16. Cylinder 32 may be comprised of titanium or a titanium alloy, and one or more bearings in accordance with the present disclosure may be disposed between cylinder 32 and piston 30 for providing sliding engagement between cylinder 32 and piston 30. Axis A may define a central axis of shock strut 12. Components located relatively closer to axis A may be referred to as radially inward, and components located relatively further from axis A may be referred to as radially outward. For example, piston 30 may be referred to as radially inward with respect to cylinder 32.

In various embodiments, piston 30 and cylinder 32 define a sealed elongate chamber at least partially filled with a liquid, such as hydraulic fluid or oil. A portion of the chamber, e.g., an upper portion of the chamber, may be filled with a gas, such as nitrogen, as is common in an air-over-oil type of shock strut.

In operation, compression of the shock strut 12 may cause piston 30 to move into cylinder 32, thereby reducing the volume of the sealed chamber, and compressing the portion filled with gas. The compressed gas may store energy in a manner similar to a spring. Relative telescoping movement of piston 30 into cylinder 32 may pump liquid from a dynamic liquid chamber, for example through an orifice plate, into a pneumatic chamber as shock strut 12 is compressed, thereby increasing resistance to compression, while simultaneously dissipating compression energy. In various embodiments, as piston 30 moves into cylinder 32, a metering pin may move into an orifice opening in the orifice plate, effectively reducing the flow area through the orifice opening and increasing resistance to further compression.

Part of the work expended in compressing shock strut 12 may be stored as recoverable spring energy in the portion filled with gas, which resiliently suspends aircraft structure 16 while on the ground, and which also allows piston 30 and cylinder 32 to return to an extended position after the compression force is removed, such as after takeoff.

Figure 2:
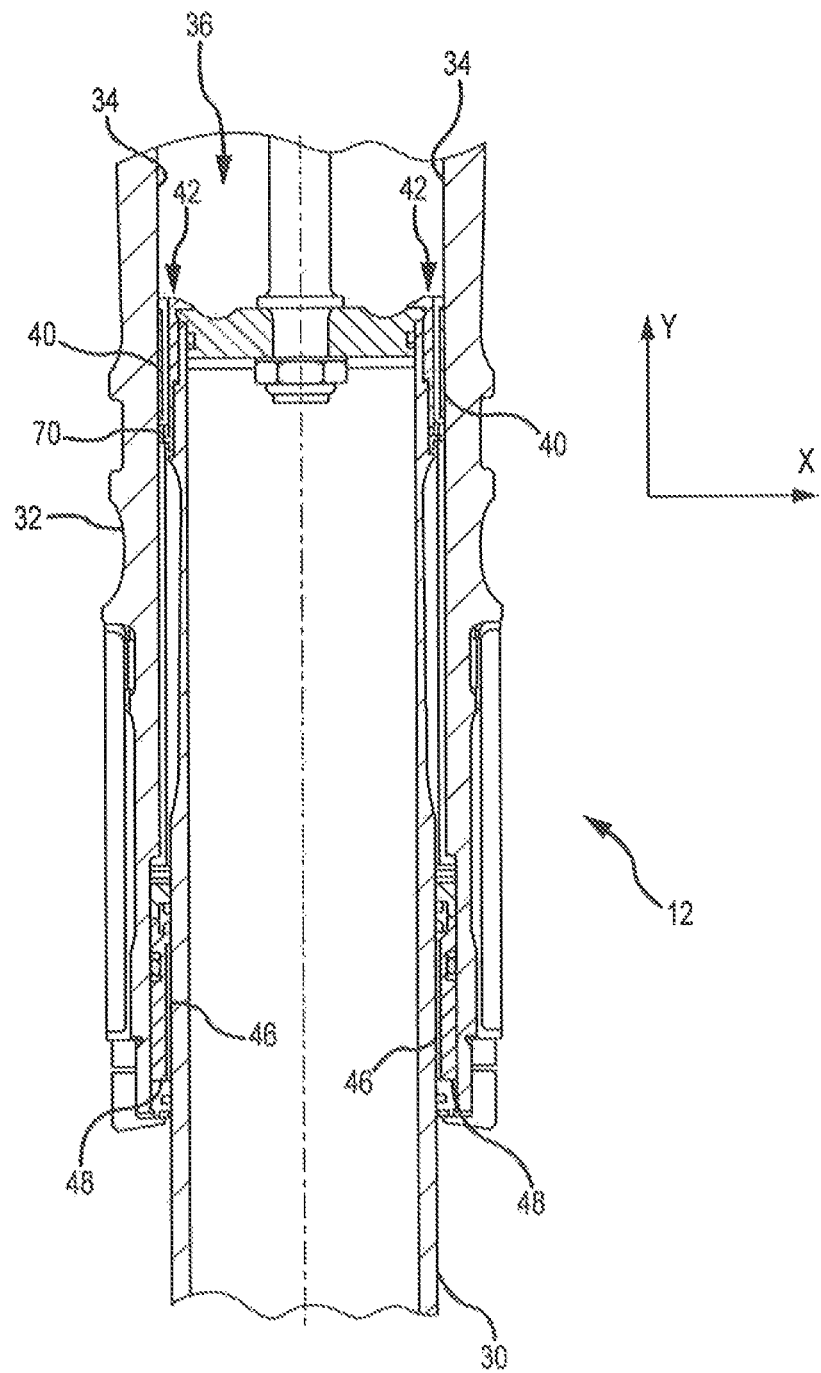
FIG. 2 illustrates a partial cross-sectional view of the shock strut of FIG. 1 taken along the line 2-2 thereof according to various embodiments.

Referring to FIG. 2, a portion, e.g., a lower portion, of an aircraft shock strut 12 is illustrated according to various embodiments. Shock strut 12 may include a piston 30 and a cylinder 32 having an inner surface 34 for receiving the piston 30 in a manner that permits relative telescoping movement between cylinder 32 and piston 30, and defines an elongate chamber 36 filled with a liquid and a gas between piston 30 and cylinder 32. In various embodiments, piston 30 may be comprised of steel. However, in various embodiments, piston 30 may be comprised of titanium and/or may be plated or otherwise coated with a suitable material, such as chrome or tungsten carbide. Aircraft shock strut 12 may further comprise a rebound damping ring 70, which is further described with reference to FIG. 3.

In various embodiments, cylinder 32 may be comprised of titanium. As used herein, the term "titanium" is intended to include titanium as well as any titanium alloy that a skilled artisan would deem suitable for use in an aircraft landing gear shock strut. Suitable titanium alloys may include, but are not limited to, alpha/near alpha alloys, alpha+beta alloys, beta alloys and the like. In various embodiments, cylinder 32 is comprised of Ti 6-22-22 or Ti 10-2-3. The above-mentioned titanium alloys are referred to by their common names. For example, "Ti 6-22-22" is the common name for Ti-6Al-2Zr-2Sn-2Mo-2Cr-0.25Si, and "Ti 10-2-3" is the common name for Ti-10V-2Fe-3Al. As mentioned above, cylinder 32 may be comprised of other suitable titanium alloys. In various embodiments, cylinder 32 may be comprised of other lightweight materials suitable for use in an aircraft landing gear shock strut.

In various embodiments, at least one of piston 30 and cylinder 32 may comprise titanium. For example, in various embodiments, piston 30 may comprise titanium and cylinder 32 may comprise steel. However, in various embodiments, piston 30 may comprise steel and cylinder 32 may comprise titanium. Additionally, in various embodiments, both piston 30 and cylinder 32 may comprise titanium.

A first bearing 40, e.g., an upper bearing, may be disposed between the piston 30 and cylinder 32. In various embodiments, first bearing 40 is mounted or otherwise coupled to piston 30 via a first bearing carrier 42, and has a bearing surface that contacts and provides sliding engagement with cylinder 32. First bearing 40 may be comprised of a non-metallic composite material that is operable to provide sliding engagement between piston 30 and inner surface 34 of cylinder 32 without creating excessive wear for inner surface 34 of cylinder 32, including in embodiments wherein cylinder 32 comprises titanium. The term "excessive wear" or "excessive wearing" may refer to wear that is significantly greater than the wear experienced in conventional assemblies, e.g., an aluminum bronze bearing sliding against a plated or bare steel cylinder.

As illustrated, a second bearing 46, e.g. a lower bearing, may be mounted or otherwise coupled to cylinder 32 via a second bearing carrier 48, and has a bearing surface contacting and providing sliding engagement with piston 30. In various embodiments, second bearing 46 also may also be comprised of a non-metallic composite material that is the same as or different from the non-metallic composite material of which first bearing 40 is comprised. Alternatively, as is discussed below, second bearing 46 may be comprised of another material, e.g., a lead-free polytetrafluoroethylene ("PTFE") material, aluminum bronze, lead-based PTFE or any other suitable material. In various embodiments, first bearing 40 may be comprised of a lead-free PTFE material.

As used herein, the terms "upper" and "lower," such as "upper bearing" and "lower bearing," refer to relative position, and are intended to facilitate explanation of the disclosure. It is not intended to limit the disclosure to any specific orientation of the aircraft shock strut unless otherwise indicated.

In the illustrated embodiment, first and second bearings 40 and 46 are generally cylindrical in shape, corresponding to a generally cylindrical cylinder 32 and piston 30. However, in various embodiments, first and/or second bearings 40 and 46 may be of some other shape or geometry if cylinder 32 and piston 30 are of some other shape or geometry. First and second bearings 40 and 46 act to transmit any ground loads from the piston 30 to the cylinder 32. Furthermore, the landing gear assembly 10 may also include a generally cylindrical centering cam (not shown) axially located between the first and second bearings 40 and 46. However, the centering cam may be of some other shape or geometry if cylinder 32 and piston 30 are of some other shape or geometry.

In addition, while the embodiment illustrated in FIG. 2 depicts first bearing 40 being mounted to piston 30, and second bearing 46 being mounted to cylinder 32, in various embodiments, one or both of first bearing 40 and second bearing 46 may be mounted to piston 30. In various embodiments, rebound damping ring 70 may be restricted from axial movement by a retaining groove such that rebound damping ring 70 acts as a simple seal against a bare titanium cylinder 32 inner surface in which rebound damping ring 70 seals liquid flow in both axial directions. In various other embodiments, rebound damping ring 70 may be axially shorter than a retaining groove to allow axial movement such that rebound damping ring 70 acts as a valve seal against a bare titanium cylinder 32 inner surface in which rebound damping ring 70 seals liquid flow one direction and allows liquid flow to by-pass the rebound damping ring 70 in the other.

Figure 3:
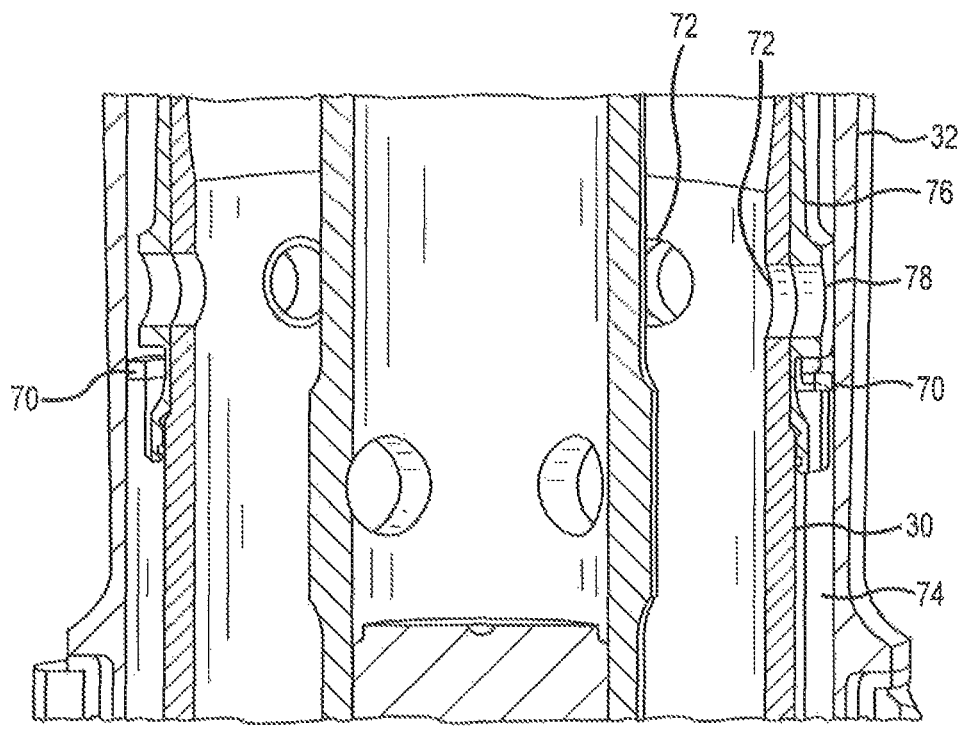
FIG. 3 illustrates a portion of a shock strut including a rebound damping ring according to various embodiments.

Referring to FIG. 3, a portion of shock strut 12 including a rebound damping ring 70 is illustrated according to various embodiments. In various embodiments, rebound damping ring 70 may be referred to as a piston ring. In various embodiments, piston 30 may be hollow and comprise a plurality of pores 72 through which a liquid may pass. In response to shock forces from wheel assembly 24, piston 30 may move into cylinder 32, causing gas in the sealed chamber to compress. As piston 30 moves into cylinder 32, the increased gas pressure may force a liquid through pores 72. The liquid may be transmitted past rebound damping ring 70 and into rebound chamber 74.

Shock strut 12 may further comprise spacer 76. Spacer 76 may be coupled to piston 30, and spacer 76 may move with piston 30 as piston 30 compresses within cylinder 32. In various embodiments, spacer may be an elongated feature integral with and/or protruding downward from first bearing 40. In various embodiments, spacer 76 may contact cylinder 32. Spacer 76 may comprise an orifice 78 which aligns with a pore 72 in piston 30. Thus, in response to shock strut compressing, the liquid may move through orifice 78 in spacer 76 and into rebound chamber 74.

Figure 4:
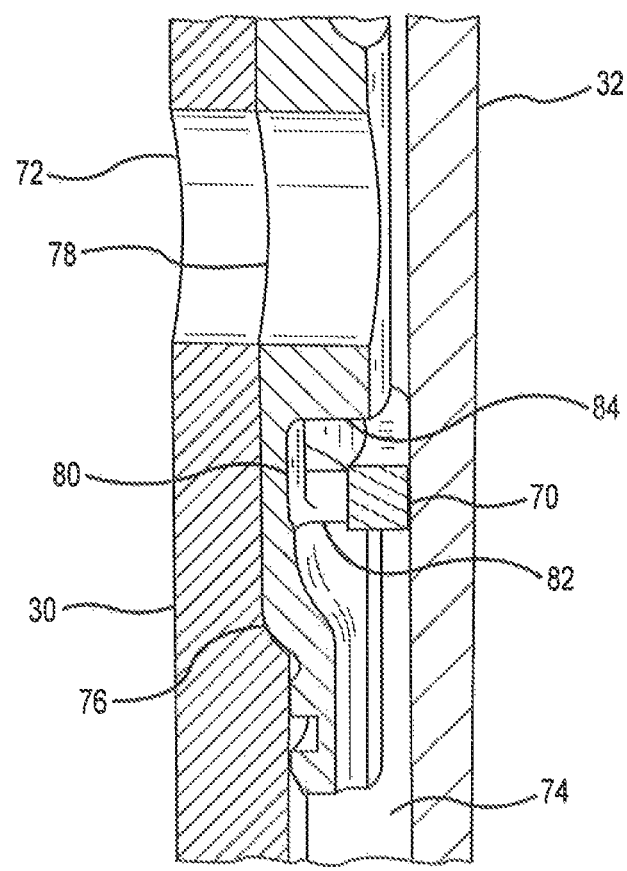
FIG. 4 illustrates an enlarged view of the portion of the shock strut of FIG. 3.

Referring to FIG. 4, an enlarged view of the shock strut of FIG. 3 is illustrated according to various embodiments. FIG. 4 shows piston 30, spacer 76, rebound damping ring 70, and cylinder 32. In various embodiments, rebound damping ring 70 may be a split piston ring. Rebound damping ring 70 may be located within a groove 80 in spacer 76 as shown. However, in various embodiments, rebound damping ring 70 may be mounted in a groove located anywhere axially between first and second bearings 40 and 46 such as, but not limited to, a groove in a centering cam or a space created between two parts. As liquid is forced through pore 72 of piston and orifice 78 in spacer 76, pressure from the liquid may cause rebound damping ring 70 to move in a downward axial direction to press against and in sliding engagement with inner surface 34 of cylinder 32. In various embodiments, rebound damping ring 70 may create a seal between rebound damping ring 70 and cylinder 32. Rebound damping ring 70 is distinguished from bearings and cams in that the rebound damping ring 70 does not act to transmit ground loads from the piston 30 to the cylinder 32. In various embodiments, rebound damping ring 70 may be comprised of a non-metallic composite material that is the same as or different from the non-metallic composite material of which at least one of first bearing 40 and second bearing 46 is comprised. The non-metallic composite material may diminish wear to cylinder 32, including in embodiments wherein cylinder 32 comprises titanium. Thus, titanium may be used for cylinder 32 without significant wear, which may reduce the overall weight of shock strut 12 as compared to heavier materials such as steel.

In various embodiments, groove 80 may be larger or axially longer than rebound damping ring 70. Thus, rebound damping ring 70 may be a floating piston ring, such that rebound damping ring 70 may move axially within groove 80 defined by a bottom groove lip 82 and a top groove lip 84 of spacer 76. During compression, bottom lip 82 defining groove 80 may contact and push up on rebound damping ring 70, maintaining an open flow path for liquid to enter rebound chamber 74. However, during extension of shock strut 12, top lip 84 defining groove 80 may contact and push down on rebound damping ring 70, sealing rebound chamber 74 closed and preventing fluid in rebound chamber 74 from exiting rebound chamber 74 during extension.

Figure 5:
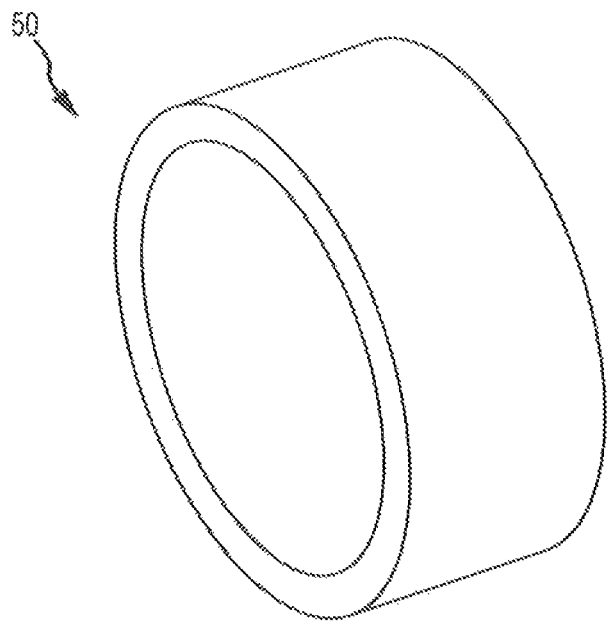
FIG. 5 illustrates a perspective view of a bearing according to various embodiments.
Figure 6:
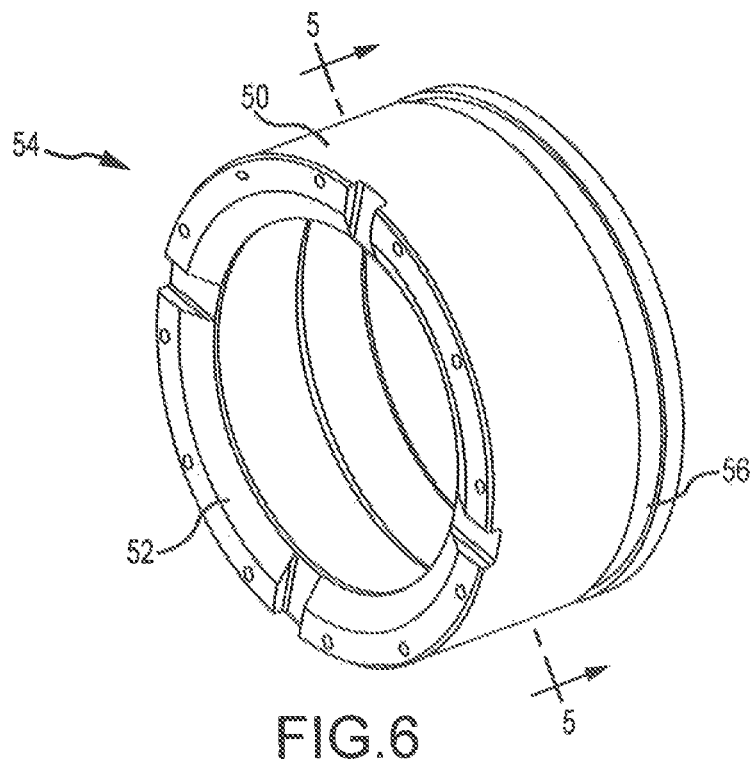
FIG. 6 illustrates a perspective view of an upper bearing assembly according to various embodiments.
Figure 7:
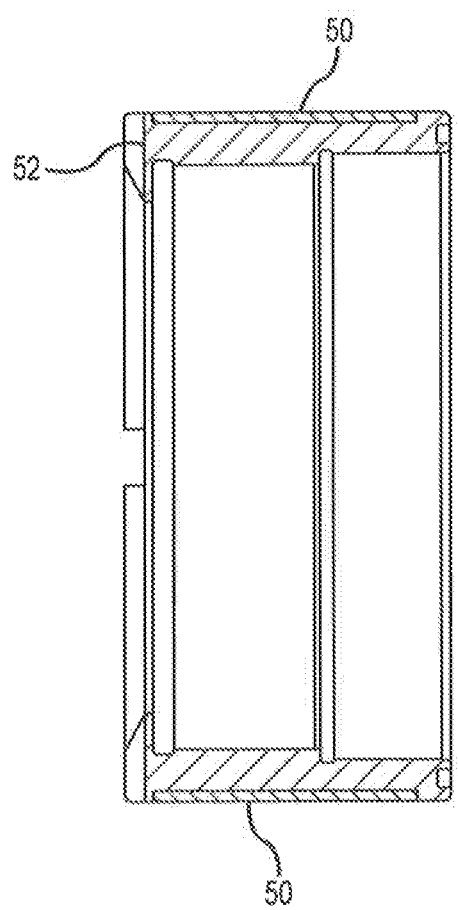
FIG. 7 illustrates a cross-sectional view of FIG. 6 taken along line 5-5 according to various embodiments.

Referring now to FIGS. 5-7, a bearing 50 is illustrated according to various embodiments. Bearing 50 may be generally cylindrical, e.g., in a sleeve configuration, and may be configured to be mounted to or on a bearing carrier 52. Bearing 50 mounted to the bearing carrier 52 will be referred to as a bearing assembly 54. Bearing 50 may be located radially outward in relation to bearing carrier 52, i.e., on the outside diameter of bearing carrier 52. In various embodiments, bearing 50 may be an upper bearing configured to mount to piston 30 of shock strut 12 via bearing carrier 52, with the bearing surface of the bearing 50 providing sliding engagement with inner surface 34 of cylinder 32. Bearing assembly 54 acts to transmit any ground loads from the piston 30 to the cylinder 32.

Bearing carrier 52 may take any suitable geometry or configuration. For example, as illustrated, bearing carrier 52 may include a recess 56, which may function as or otherwise house a retainer. Bearing carrier 52 may be made from any suitable material, such as aluminum, a non-metallic composite material or the like. Bearing 50 may be configured as a cylindrical sleeve mountable to bearing carrier 52. Configuring bearing 50 as a sleeve mountable to bearing carrier 52 may be useful for keeping the cost of the "wearing part" relatively low, while allowing for complexity in the configuration of bearing carrier 52. In various embodiments, bearing 50 may be a single homogeneous piece made of the same material. That is, bearing 50 and bearing carrier 52 may be formed as a single piece made of a single material.

In various embodiments, at least one of rebound damping ring 70 and bearing 50 is comprised of a non-metallic composite material that is operable to slidingly engage inner surface 34 of cylinder 32 without creating excessive wearing of inner surface 34 of cylinder 32. In various embodiments, at least one of rebound damping ring 70 and bearing 50 may be comprised of a polyimide resin, such as a prepreg made from monomeric mixtures used to form polymerized imides or polyimides. One example of such a composition is available commercially under the trademark SUPERIMIDE owned by Goodrich Corporation. Two examples of SUPERIMIDE brand composite materials used to form bearings according to the present disclosure are commercially available from Goodrich Corporation under the names SM438 and SC415. One example of a suitable polyimide material is discussed in U.S. Pat. No. 5,338,827 to Serafini et al., which is incorporated herein by reference in its entirety. Other SUPERIMIDE brand compositions, as well as other polyimide compositions may be used in various embodiments.

In various embodiments, at least one of rebound damping ring 70 and bearing 50 may be comprised of an engineered plastic, such as a polyketone thermoplastic material. An example of a suitable polyketone thermoplastic material is available commercially under the trademark ARLON owned by Greene, Tweed. An ARLON brand composition is commercially available under the name ARLON 1286. Other ARLON brand compositions, as well as other polyketone thermoplastic materials may be used in various embodiments.

Referring back to FIG. 2, in various embodiments, inner surface 34 of cylinder 32 may be bare titanium. As used herein, the term "bare" includes a surface that is not plated or otherwise coated by another metal or other wear-resistant material (or has minimal or insufficient coating). Use of a piston ring or bearing comprised of one or more of the above-identified non-metallic compositions may allow sliding engagement with the inner surface of a bare titanium cylinder without causing excessive wear. In various embodiments, inner surface 34 of cylinder 32 may be plated or otherwise coated with a wear-resistant material. Examples of suitable wear-resistant materials include, for example, electroless nickel and nickel-boron. Other wear-resistant materials also may be employed in various embodiments.

In various embodiments, at least one of rebound damping ring 70 and first upper bearing 40 may be comprised of one of the non-metallic compositions discussed above, while second lower bearing 46 may be fixed to the cylinder 32 and provide sliding engagement with piston 30 by way of a bearing surface comprising a lead-free PTFE material sold under the trademark DP4™ by GGB (formerly Glacier Garlock Bearings). DP4 is a metal-polymer composite material comprising steel, porous bronze sinter, PTFE, and fillers. In various embodiments, lower bearing 46 may include a bearing surface formed by any other suitable material. As another alternative, the upper bearing also could include a bearing surface formed by the lead-free PTFE material sold under the trademark DP4™ by GGB or another suitable material. In various embodiments, piston 30 may comprise a bare titanium outer surface in contact with lower bearing 46. Lower bearing 46 may comprise a bearing surface comprising at least one of a polymide resin, such as SM438 or SC415, and a polyketone thermoplastic material, such as ARLON 1286, which may slidingly contact the outer surface of piston 30 without causing excessive wear.

Figure 8:
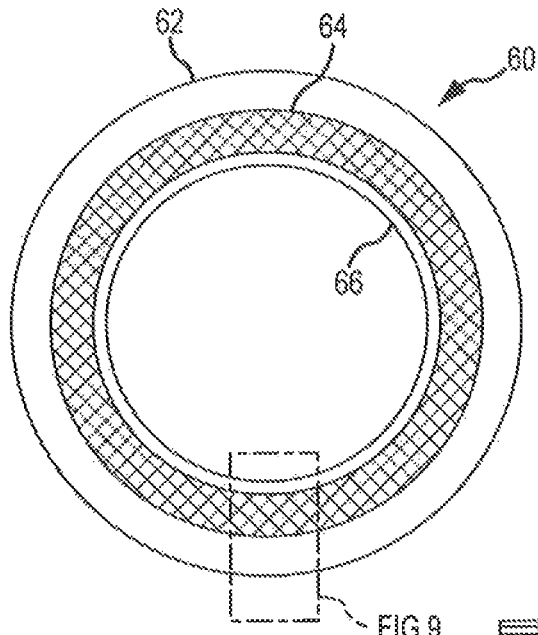
FIG. 8 illustrates a side view of a bearing according to various embodiments.
Figure 9:
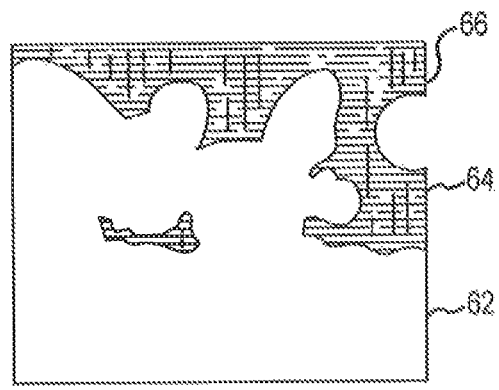
FIG. 9 illustrates an enlarged sectional view of a portion of the bearing of FIG. 8 according to various embodiments.

Referring to FIGS. 8 and 9, a bearing 60 is shown according to various embodiments. The bearing 60 may be a lower bearing that acts to transmit any ground loads from the piston 30 to the cylinder 32, and may include a support structure 62, an intermediate layer 64, e.g., a porous layer, on the support structure 62, and a bearing surface layer 66 (also referred to simply as a bearing surface) on and/or impregnated into the intermediate layer 64. In various embodiments, intermediate layer 64 is a porous layer, and bearing surface layer 66 is made of a lead-free polytetrafluoroethylene (PTFE) material on and/or impregnated into the porous layer. In the illustrated embodiment, the porous layer 64 is shown to be on an inner surface of the support structure 62, e.g., radially inward relative to support structure 62, with bearing surface layer 66 on or impregnated into an inner surface of porous layer 64. However, in various embodiments the bearing surface may be disposed radially outward relative to support structure 62, e.g., if the bearing was used as an upper bearing on piston 30.

In various embodiments, support structure 62 may be comprised of aluminum bronze. One advantage of a support structure comprised of aluminum bronze is that damage to the cylinder and/or the piston may be reduced if the bearing surface were to fail. However, in various embodiments support structure 62 may be comprised of any material operable to support porous layer 64 and withstand the process of impregnating and sintering bearing material layer 66. For example, support structure 62 may be comprised of another metal, such as a low carbon steel, a metal-plated material, a non-metal material or the like.

In various embodiments, porous layer 64 may comprise any material operable to key or otherwise link bearing surface layer 66 to support structure 62, including, but not limited to, bronze particles sintered to the support structure, copper particles sintered to support structure 62 and the like.

In various embodiments, bearing surface layer 66 may be comprised of a lead-free PTFE material that is on and/or impregnated into porous layer 64. In various embodiments, the lead-free PTFE bearing surface layer material described herein may provide a sufficiently low coefficient of friction, minimal stick-slip or stiction, and resistance to corroding or otherwise contaminating the hydraulic fluid or oil within the shock strut.

In various embodiments, the lead-free PTFE material may comprise a continuous consolidated structure including a continuous PTFE matrix and discrete particles of a lead-free additive material. The particles may be microscopically and macroscopically homogeneously distributed with the PTFE polymer matrix.

In various embodiments, the additive material may comprise a material suitable for incorporation into an extruded unsintered tape, such that the tape is operable to be impregnated into porous layer 64 disposed on support structure 62 and operable to withstand the processing temperatures used to consolidate bearing surface layer material.

Tapes that are operable to be impregnated into a porous layer disposed upon a support structure may include those that can be impregnated without compacting or closing up the pores of porous layer 64, or those that can suitably adhere to porous layer 64. Any amount of additive material may be included in bearing surface layer 66. In various embodiments, the amount of additive material included in bearing surface layer 66 is such that enough PTFE is present to form a continuous consolidated layer.

In various embodiments, the additive material may comprise an inorganic particulate filler, such as, but not limited to, ionic fluorides including calcium fluoride, magnesium fluoride, tin fluoride; metal oxides, including, for example, iron oxide, aluminum oxide, titanium dioxide, zinc oxide; and metal hydroxides such as aluminum hydroxide. In various embodiments, the additive material may comprise an inorganic particulate filler comprising calcium fluoride. The particle size of the inorganic particulate filler may be determined by a size operable to improve cavitation erosion resistance and wear resistance while retaining desirable low friction properties. In various embodiments, wherein the additive material comprises calcium fluoride, the calcium fluoride may have a mean diameter particle size of less than or equal to 10 microns. In various embodiments, the calcium fluoride may have a mean diameter particle size of less than or equal to 2 microns. In various embodiments, the amount of inorganic particulate filler in the bearing material layer is between 10 to 30% by volume. However, other particle sizes and concentrations may be used in various embodiments.

In various embodiments, the additive material may comprise polyphenylene sulphide particles. In various embodiments, the amount of polyphenylene sulphide in the bearing material layer is between 30 and 70% by volume. In various embodiments, the amount of polyphenylene sulphide is 50% by volume. In various embodiments, the polyphenylene sulphide has a mean diameter particle size of less than or equal to 60 microns. In various embodiments, the polyphenylene sulphide has a mean diameter particle size of less than or equal to 20 microns.

In various embodiments, bearing surface layer 66 may further comprise an organic filler material including, but not limited to, tetrafluoroethylene-perfluoroalkylvinylether copolymers, tetrafluoroethylene-hexafluoropropylene copolymer, tetrafluoroethylene propylene ether polymer, tetrafluoroethylene-ethylene copolymers, polychlorotrifluoroethylene polymers, polychlorotrifluoroethylene-ethylene copolymers, hexafluoroisobutylene polymers, hexafluoroisobutylene-vinylidene fluoride copolymers or hexafluoro propylene polymer. A melt processable organic filler material, such as those listed above, may be included to modify the crystallinity of the PTFE in the extruded unsintered tape and/or bearing surface layer 66.

The extruded unsintered tape that may make up bearing surface layer 66 may be produced by any suitable method, including the method described in U.S. Pat. No. 5,697,390, incorporated herein by reference in its entirety, where PTFE particles and additive particles are mixed with an air impact pulverizer and then extruded to form a tape.

The extruded unsintered tape may be impregnated into porous layer 64 by means of a rolling mill, for example. The step of impregnating may be conducted under conditions and temperatures that do not sinter the tape or melt any polymer material in the tape.

In response to impregnating the extruded unsintered tape into a porous layer to form a bearing surface layer, the bearing surface layer may be sintered to produce a three-layer composite material comprising a continuous consolidated bearing surface layer. In various embodiments, all the PTFE in the bearing surface layer is sintered.

As used herein, sintering or consolidating a tape or bearing surface layer refers to heating PTFE to its melting point or above. In response to the PTFE being heated above its melting point, which may be between 350 degrees Celsius (662 degrees F.) and 425 degrees Celsius (797 degrees F.), the PTFE is consolidated or densified. Before heating above its melting point, PTFE is relatively soft and may be manipulated into structures such as a porous layer with minimal applied force and without heat.

An advantage of a bearing having a bearing surface formed by a lead-free PTFE material and the method of manufacture described herein may be that the bearing surface may be substantially blister free because the extruded unsintered tape may not require liquid lubricant in an amount that could cause blistering under the conditions used to sinter the tape.

Details concerning the composition of and process of making the lead-free PTFE bearing surface material layer are discussed in publication number WO 2004/079217, which is incorporated herein by reference in its entirety.

Figure 10:
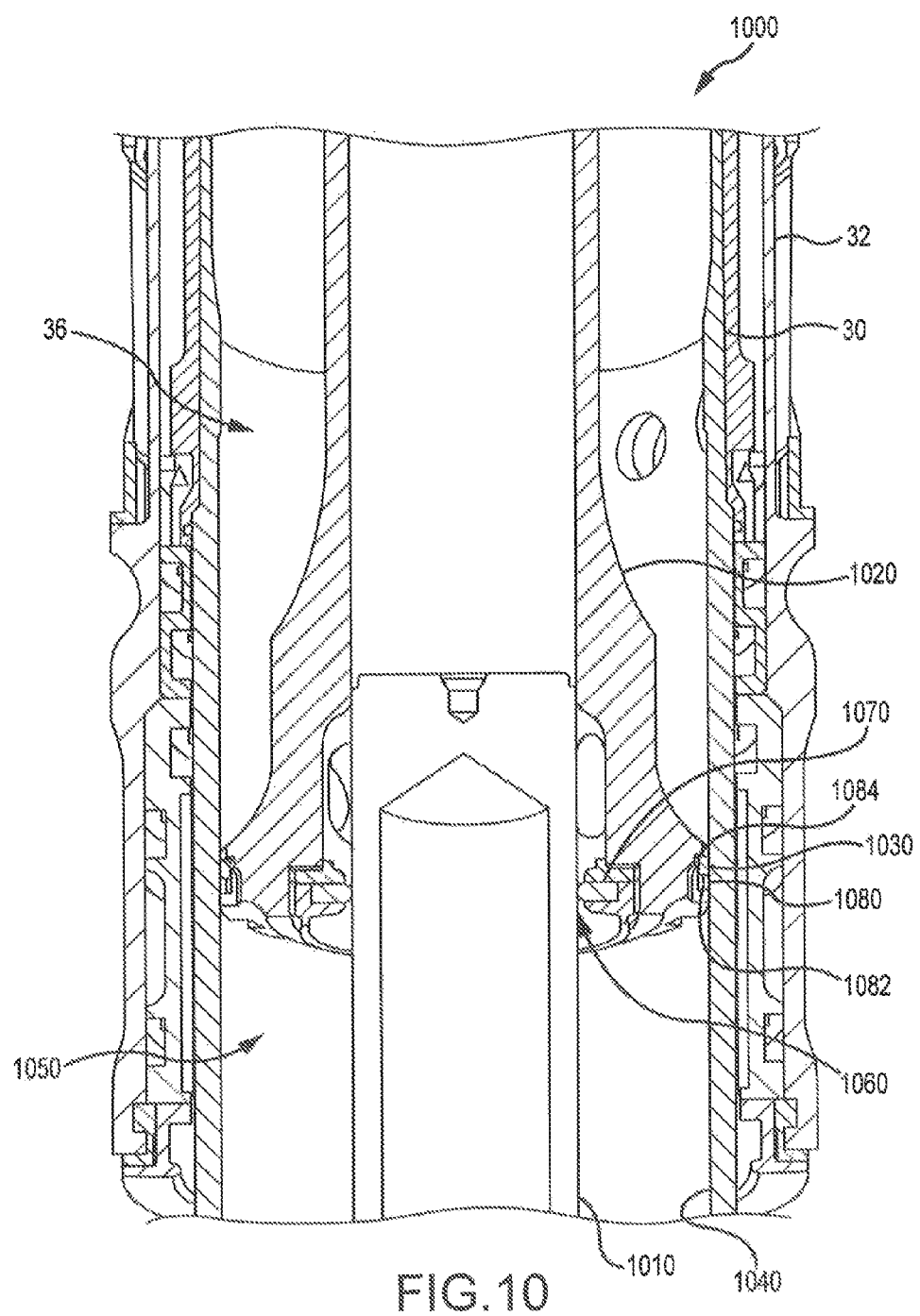
FIG. 10 illustrates a portion of a shock strut including a main compression damping ring.

Referring to FIG. 10, a shock strut 1000 is illustrated according to various embodiments. Shock strut 1000 may comprise piston 30, cylinder 32, metering pin 1010, and metering tube 1020. Metering tube 1020 is an orifice support tube that may further comprise main compression damping ring 1030. In various embodiments, main compression damping ring 1030 may be referred to as a piston ring. In various embodiments, main compression damping ring 1030 may be restricted from axial movement by a retaining groove such that main compression damping ring 1030 acts as a simple seal against a bare titanium piston 30 inner surface in which main compression damping ring 1030 seals liquid flow in both axial directions. In various other embodiments, main compression damping ring 1030 may be axially shorter than a retaining groove to allow axial movement such that main compression damping ring 1030 acts as a valve seal against a bare piston 30 inner surface in which main compression damping ring 1030 seals liquid flow one direction and allows liquid flow to by-pass main compression damping ring 1030 in the other. Main compression damping ring 1030 may contact and slidingly engage an inner surface 1040 of piston 30. Main compression damping ring 1030 may be located within a groove 1080 in metering tube 1020. In various embodiments, Main compression damping ring 1030 may create a seal between main compression damping ring 1030 and piston 30. Main compression damping ring 1030 is distinguished from bearings and cams in that the main compression damping ring 1030 does not act to transmit ground loads from the piston 30 to the cylinder 32. In various embodiments, main compression damping ring 1030 may be comprised of a non-metallic composite material that is the same as or different from the non-metallic composite material of which at least one of rebound damping ring 70, first bearing 40, and second bearing 46 is comprised. The non-metallic composite material may diminish wear to piston 30, including in embodiments wherein piston 30 comprises titanium. Thus, titanium may be used for piston 30 without significant wear, which may reduce the overall weight of shock strut 12 as compared to heavier materials such as steel.

In various embodiments, groove 1080 may be larger or axially longer than main compression damping ring 1030. Thus, main compression damping ring 1030 may move axially within groove 1080 defined by a bottom groove lip 1082 and a top groove lip 1084 of metering tube 1020. During shock strut extension, bottom lip 1082 defining groove 1080 may contact and push up on main compression damping ring 1030, maintaining an open flow path for liquid to enter dynamic oil chamber 1050 from elongate chamber 36. However, during compression of shock strut 1000, top lip 1084 defining groove 1080 may contact and push down on main compression damping ring 1030, sealing dynamic oil chamber 1050 closed between metering tube 1020 and piston 30, and preventing fluid in dynamic oil chamber 1050 from exiting dynamic oil chamber 1050 between metering tube 1020 and piston 30 during compression. During compression and extension, oil may be transferred between dynamic oil chamber 1050 and elongate chamber 36 though orifice 1060 located between metering pin 1010 and orifice plate 1070.

In various embodiments, main compression damping ring 1030 may be in sliding contact with inner surface 1040 of piston 30. A material of main compression damping ring 1030 may be selected based on a material of piston 30. For example, in embodiments where piston 30 comprises a bare steel inner surface 1040, main compression damping ring 1030 may comprise traditional strut bearing materials such as Al—Ni—Bz. However, in various embodiments, piston 30 may comprise titanium or a titanium alloy. Piston 30 may further comprise a bare inner surface. In such cases, a main compression damping ring 1030 comprising Al—Ni—Bz may cause excessive wear on inner surface 1040 of piston 30. Thus, in various embodiments, main compression damping ring 1030 may comprise at least one of a polymide resin, such as SM438 or SC415, and a polyketone thermoplastic material, such as ARLON 1286, which may slidingly contact inner surface 1040 of piston 30 without causing excessive wear.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shock strut comprising:
    a piston having a piston inner surface and a piston outer surface;
    at least one telescoping component coaxially aligned and slidably engagable with the piston, wherein the at least one telescoping component comprises a titanium material;
    a groove defined by an upper lip and a lower lip coupled to at least one of the piston or the at least one telescoping component;
    at least one piston ring in direct contact with the titanium material, wherein the at least one piston ring comprises a non-metallic material providing sliding engagement with the titanium material to seal a radial space between the piston and the at least one telescoping component, wherein the at least one piston ring is at least partially held within the groove, and wherein the groove limits axial movement of the at least one piston ring; and
    at least one of a spacer or a bearing coupled to the piston and located radially outward of the piston, wherein the groove is defined within a surface of the spacer.

2. The shock strut according to claim 1, wherein the at least one piston ring is comprised of a non-metallic composite material.

3. The shock strut according to claim 1, wherein the at least one telescoping component comprises a cylinder coaxially aligned with and located radially outward of the piston, the cylinder having a cylinder inner surface and a cylinder outer surface.

4. The shock strut according to claim 3, wherein the cylinder comprises titanium and the cylinder inner surface comprises bare titanium.

5. The shock strut according to claim 4, wherein the groove is coupled to the piston outer surface.

6. The shock strut according to claim 1, wherein the piston comprises titanium and the piston inner surface comprises bare titanium.

7. The shock strut according to claim 1, wherein the at least one piston ring is formed by a prepreg made from a monomeric mixture used to form polymerized imides.

8. The shock strut according to claim 1, wherein the at least one piston ring is formed by a polyketone thermoplastic material.

9. The shock strut according to claim 1, wherein the at least one piston ring is incapable of transmitting a ground load from the piston to the at least one telescoping component.

10. The shock strut according to claim 1, wherein the at least one piston ring is axially moveable within the groove.

11. The shock strut according to claim 10, wherein the movement of the at least one piston ring in one direction is capable of maintaining an open fluid flow path past a radially inner surface of the at least one piston ring, and wherein movement of the at least one piston ring in the opposite direction is capable of restricting the fluid flow path or motion in both directions of the at least one piston ring is capable of restricting the fluid flow path.

12. The shock strut according to claim 1, wherein the at least one telescoping component comprises a first telescoping component and a second telescoping component.

13. The shock strut according to claim 12, wherein the first component comprises a cylinder coaxially aligned with and located radially outward of the piston, the cylinder having a cylinder inner surface and a cylinder outer surface.

14. The shock strut according to claim 13, wherein the second component comprises an orifice support tube coaxially aligned with and located radially inward of the piston, the orifice support tube having a support tube outer surface.

15. The shock strut according to claim 14, wherein the cylinder inner surface comprises bare titanium, and wherein the piston inner surface comprises bare titanium.

16. An aircraft shock strut comprising:
a piston having a piston inner surface and a piston outer surface;
at least one telescoping component coaxially aligned and slidably engagable with the piston;
a groove defined by an upper lip and a lower lip coupled to at least one of the piston or the at least one telescoping component;
at least one piston ring in contact with the piston, wherein the at least one telescoping component comprises a titanium material, wherein the at least one piston ring comprises a non-metallic material providing sliding engagement with the titanium material to seal a radial space between the piston and the at least one telescoping component, wherein the at least one piston ring is at least partially held within the groove, and wherein the groove limits axial movement of the at least one piston ring; and
at least one of a spacer or a bearing coupled to the piston and located radially outward of the piston, wherein the groove is defined within a surface of the spacer.

17. An aircraft landing gear comprising:
a piston having a piston inner surface and a piston outer surface;
at least one telescoping component coaxially aligned and slidably engagable with the piston;
a groove defined by an upper lip and a lower lip coupled to at least one of the piston or the at least one telescoping component;
at least one piston ring in contact with the piston, wherein the at least one telescoping component comprises a titanium material, wherein the at least one piston ring comprises a non-metallic material providing sliding engagement with the titanium material to seal a radial space between the piston and the at least one telescoping component, wherein the at least one piston ring is at least partially held within the groove, and wherein the groove limits axial movement of the at least one piston ring; and
at least one of a spacer or a bearing coupled to the piston and located radially outward of the piston, wherein the groove is defined within a surface of the spacer.

* * * * *